(12) United States Patent
Liu et al.

(10) Patent No.: US 7,929,384 B2
(45) Date of Patent: Apr. 19, 2011

(54) MULTI-STAGE DISK-FEEDING APPARATUS FOR INFORMATION STORAGE DISKS

(75) Inventors: Ming-Hsun Liu, Taipei (TW);
Chung-Hsuan Tsai, Taipei (TW)

(73) Assignee: Ming-Hsun Liu, Taipei (TW)

( * ) Notice: Subject to any disclaimer, the term of this patent is extended or adjusted under 35 U.S.C. 154(b) by 701 days.

(21) Appl. No.: 11/856,637

(22) Filed: Sep. 17, 2007

(65) Prior Publication Data
US 2008/0247083 A1    Oct. 9, 2008

(51) Int. Cl.
*G11B 17/22* (2006.01)
(52) U.S. Cl. .................................................. 369/30.85
(58) Field of Classification Search .............. 369/30.85
See application file for complete search history.

(56) References Cited

U.S. PATENT DOCUMENTS

| | | | | |
|---|---|---|---|---|
| 5,844,880 A | * | 12/1998 | Motoki et al. ................ | 720/614 |
| 5,914,918 A | * | 6/1999 | Lee et al. .................... | 369/30.32 |
| 5,959,958 A | * | 9/1999 | Inatani et al. ............... | 369/30.85 |
| 6,134,212 A | * | 10/2000 | Pines et al. .................. | 369/30.85 |
| 6,141,298 A | * | 10/2000 | Miller ......................... | 369/30.33 |
| 6,212,139 B1 | * | 4/2001 | Nakamura et al. ......... | 369/30.85 |
| 6,321,649 B1 | * | 11/2001 | Vangen et al. ............... | 101/35 |
| 6,337,842 B1 | * | 1/2002 | Wolfer et al. .............. | 369/30.57 |
| 6,400,659 B1 | * | 6/2002 | Kitaoka ...................... | 369/34.01 |
| 6,490,232 B2 | * | 12/2002 | Sato ........................... | 369/30.34 |
| 6,760,052 B2 | * | 7/2004 | Cummins et al. ........... | 347/171 |
| 6,990,674 B1 | * | 1/2006 | Cummins et al. ........... | 720/623 |

* cited by examiner

*Primary Examiner* — Mark Blouin
(74) *Attorney, Agent, or Firm* — Pai Patent & Trademark Law Firm; Chao-Chang David Paj

(57) ABSTRACT

A disk-feeding apparatus includes a base, two or more than two disk-feeding devices and an intermediate conveyer associated with the disk-feeding devices. The disk-feeding devices are mounted on the base and hold respectively stacks of disks. An intermediate conveyer is mounted between each pair of adjacent disk-feeding devices to convey a disk from a first disk-feeding device to a second disk-feeding device of each pair of adjacent disk-feeding devices.

9 Claims, 5 Drawing Sheets

MULTI-STAGE DISK-FEEDING APPARATUS FOR INFORMATION STORAGE DISKS

RELATED APPLICATIONS

This present disclosure is related to the following U.S. patent application Ser. No. 11/697,298, filed Apr. 6, 2007, entitled DISK-FEEDING APPARATUS FOR INFORMATION STORAGE DISKS, the entire disclosure of which is hereby incorporated herein by reference.

BACKGROUND

1. Field of the Invention

The present invention relates to a feeding apparatus for information storage disks. More particularly, the present invention relates to a feeding apparatus that uses rotational components to feed information storage disks is such as compact disks, and the feeding apparatus that holds multiple stacks of information storage disks to feed or vend.

2. Description of Related Art

Information storage disks, such as compact disks (CDs) including Compact Disc-Recordable (CD-R), Compact Disc ReWritable (CD-RW), DVD recordable (DVD-R) etc. store digital information in a variety of formats. Generally, for home users or small business users, burners are often used to replicate disks when only several or tens of disk copies are needed. In addition, automatic burners are convenient to the home users or small business users and save much time when duplicating the compact disks.

However, a conventional automatic compact disk duplication system only holds a single stack of blank disks to duplicate. A single stack of blank disks comprises an amount of a hundred or less pieces of blank disks. Thus, it is inconvenient because it is needed to regularly supply or refill the blank disks when the single stack of blank disks in the disk duplication system is exhausted or empty. Further, disk vending machines are becoming more common and popular in the market. The disk vending machines sells blank disks to a person who only needs one or several blank disks to duplicate. Likewise, if the disk vending machines can hold more stacks of blank disks inside, it does not need to be regularly supplied or refilled with disks.

Therefore, there is a need to provide an improved disk-feeding apparatus to mitigate or obviate the aforementioned problems.

SUMMARY

An object of the present invention is to provide a multiple-stage disk-feeding apparatus that holds two or more than two stacks of disks, which addresses problems of conventional disk-feeding apparatus.

An embodiment of a disk-feeding apparatus for information storage disks in accordance with the present invention comprises a base, two or more than two disk-feeding devices and an intermediate conveyer associated with the disk-feeding devices.

The disk-feeding devices are mounted on the base and each holds a disk stack. An intermediate conveyer is mounted between each pair of adjacent disk-feeding devices to convey a disk from a first disk-feeding device to a second disk-feeding device of each pair of adjacent disk-feeding devices.

Consequently, since the disk-feeding apparatus holds several stacks of disks to feed, it does not need to be frequently refilled with disks. Thus, the disk-feeding apparatus is convenient and easy to use.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
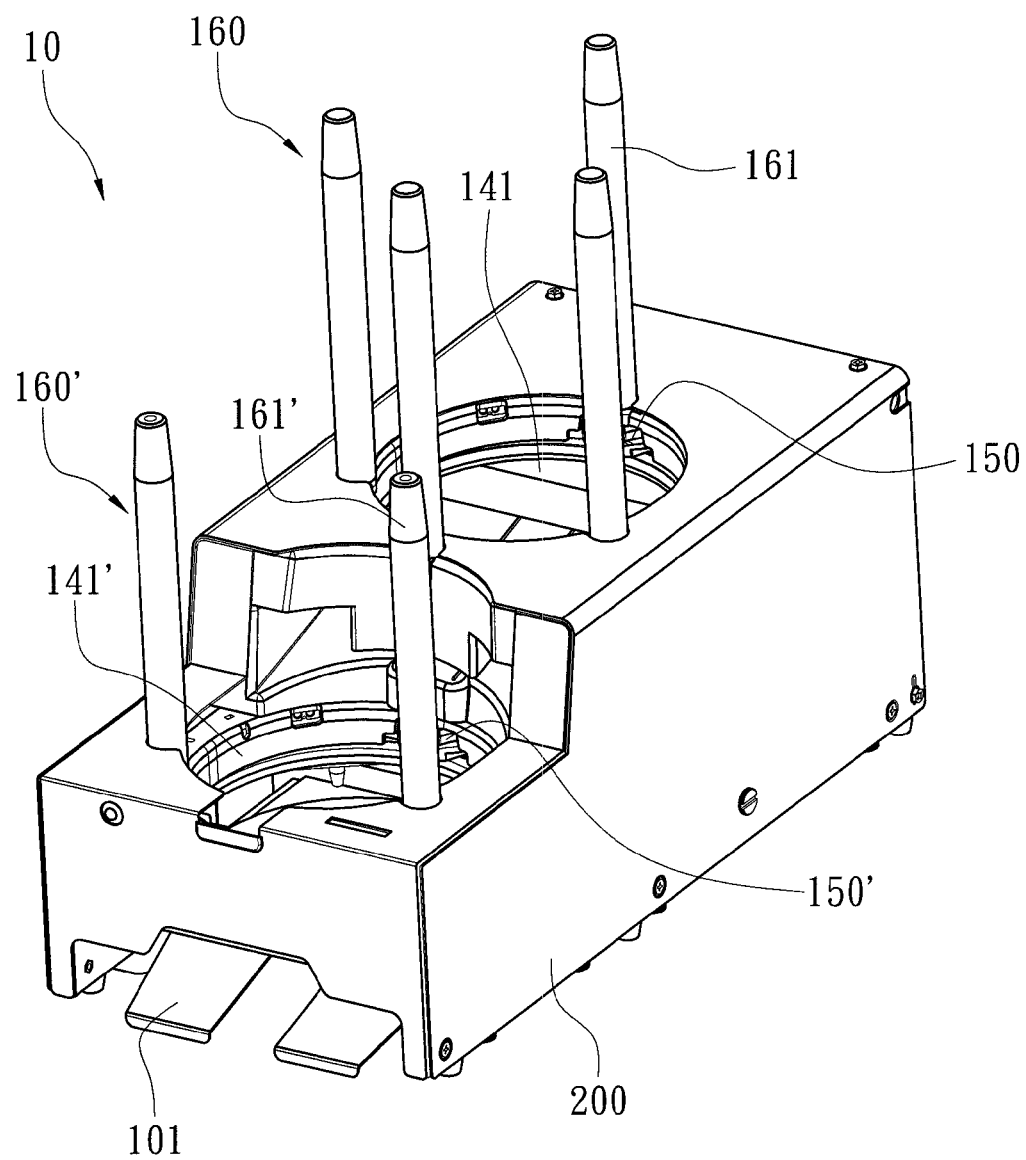
FIG. 1 is a perspective view of an embodiment of a disk-feeding apparatus in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
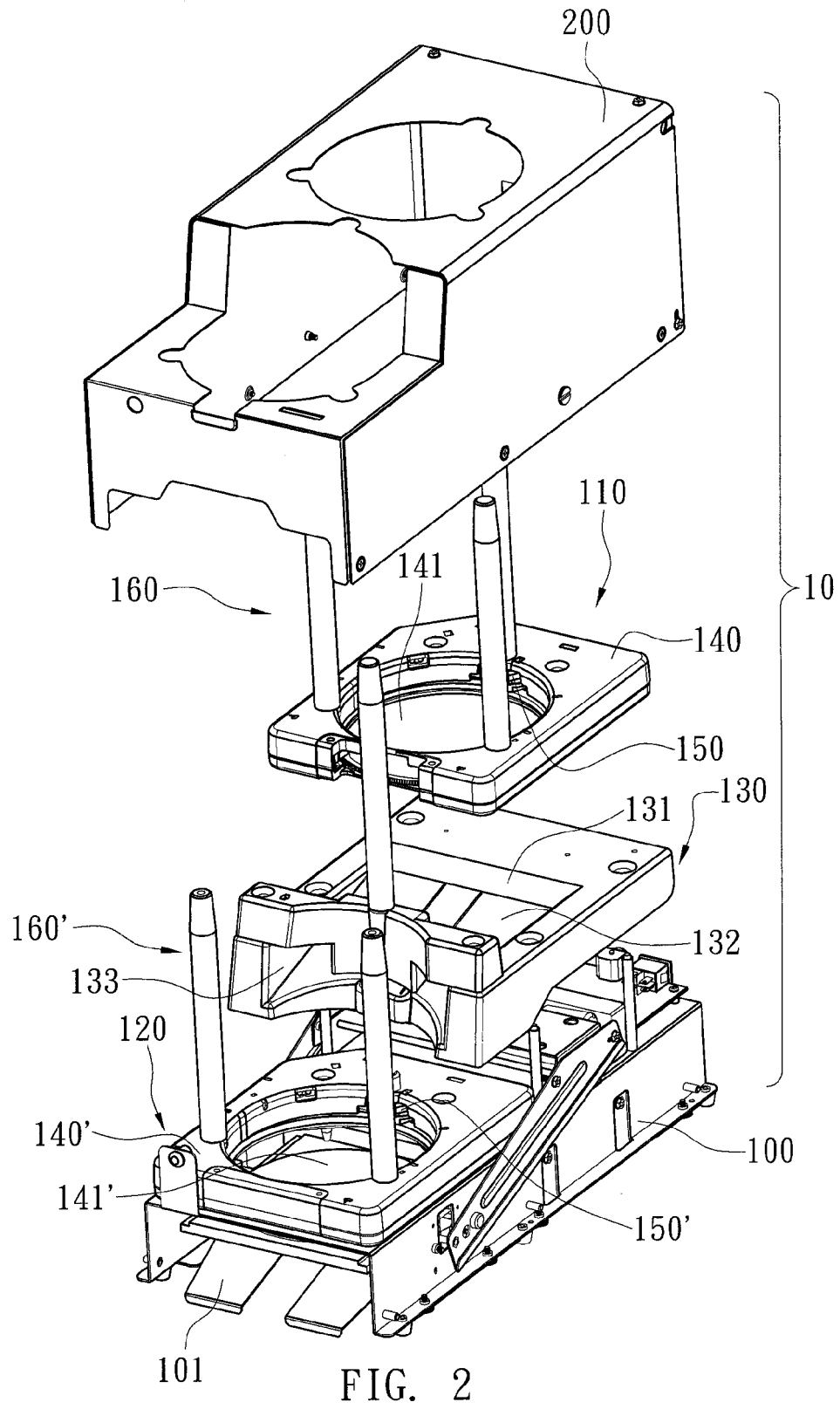
FIG. 2 is an exploded perspective view of the disk-feeding apparatus in FIG. 1.

Refer to FIG. 1 and FIG. 2. An embodiment of a disk-feeding apparatus 10 for information storage disks comprises a base 100, multiple disk-feeding devices, one or more than one intermediate conveyers, and a casing 200. For conveniently illustrative purposes only, the embodiment discloses the disk-feeding apparatus 10 comprises two disk-feeding devices including a first disk-feeding device 110 and a second disk-feeding device 120, and an intermediate conveyer 130 in-between the disk-feeding devices 110 and 120. However, the amount of disk-feeding devices may be modified to accommodate various applications.

The first disk-feeding device 110 and the second disk-feeding device 120 are mounted on the base 100 where the first disk-feeding device 110 is located higher than the second disk-feeding device 120. The base 100 has a tray 101. Each disk-feeding device 110, 120 comprises a body 140,140' a disk-feeding mechanism 150,150' and a disk-guiding device 160,160'. Each body 140,140' has a disk-feeding hole 141, 141'. The casing 200 is mounted outside the base 100.

Figure 3:
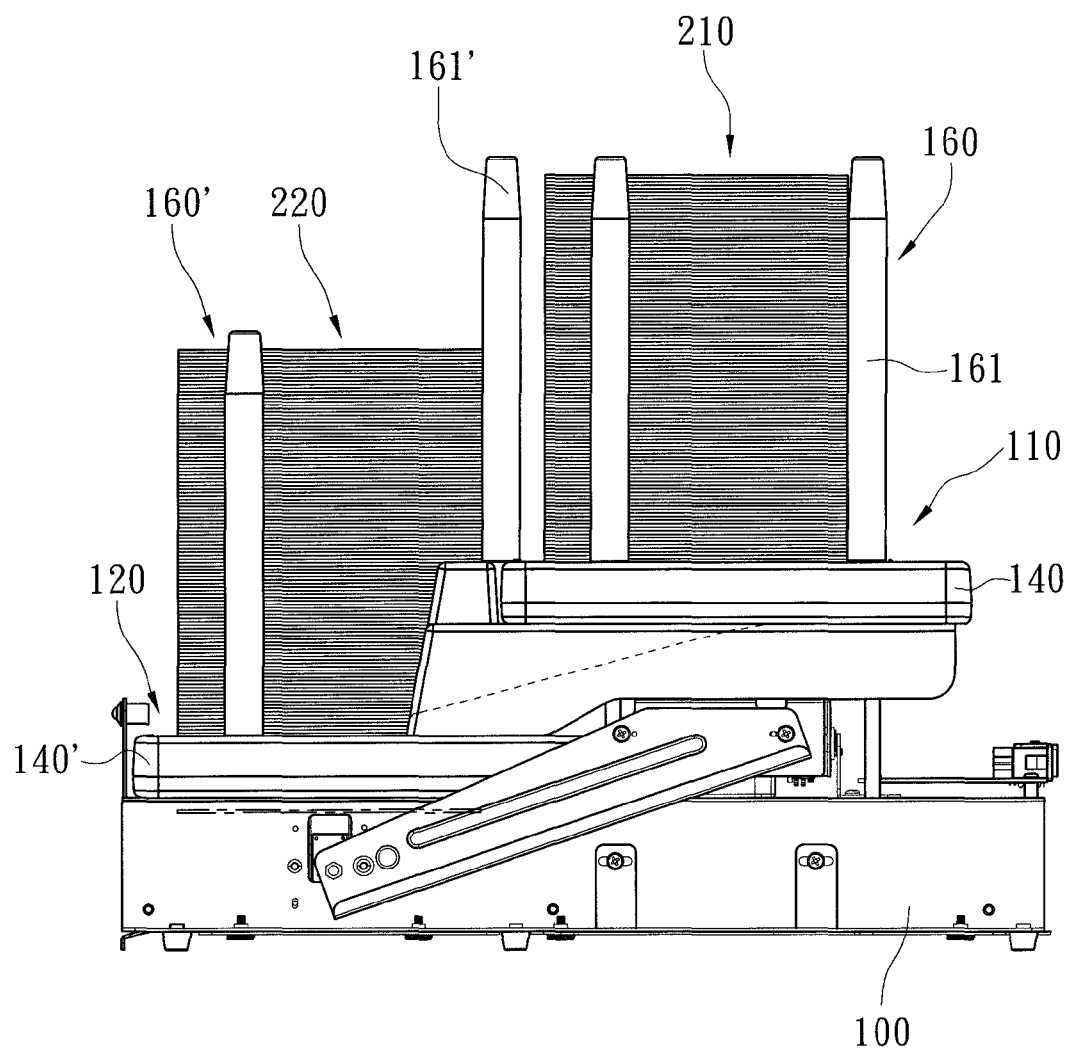
FIG. 3 is an elevation view of the disk-feeding apparatus in FIG. 1 with holding two stacks of disks.

Further refer to FIG. 3. The disk-feeding mechanisms 150, 150' are respectively mounted in the bodies 140,140' and hold respectively a first stack of disks 210 and a second stack of disks 220. The disk-feeding mechanisms 150,150' gradually and sequentially feed the bottom disk of the disk stack 210, 220 onto the tray 101 or the intermediate conveyer 130 (only one single disk is fed once). Each disk-guiding device 160, 160' comprises multiple posts 161,161' that holds a stack of blank disk.

In some embodiments, the disk-feeding devices 110, 120, the bodies 140,140', the disk-feeding mechanisms 150,150', the disk-guiding device 160,160' and operations of them are described in the commonly-owned and copending U.S. patent application Ser. No. 11/697,298, filed Apr. 6, 2007, entitled "DISK-FEEDING APPARATUS FOR INFORMATION STORAGE DISKS", the entire disclosure of which is hereby incorporated herein by reference.

The intermediate conveyer 130 comprises a disk inlet 131, an inclined conveying surface 132 and a disk outlet 133. The disk inlet 131 is positioned under the disk-feeding hole 141 of the first disk-feeding device 110. The inclined conveying surface 132 is defined between the disk inlet 131 and the disk outlet 133 on which a disk passing through the disk inlet 131 slides to the disk outlet 133. The disk outlet 133 is positioned over the disk-feeding hole 141' of the second disk-feeding device 120.

Figure 4:
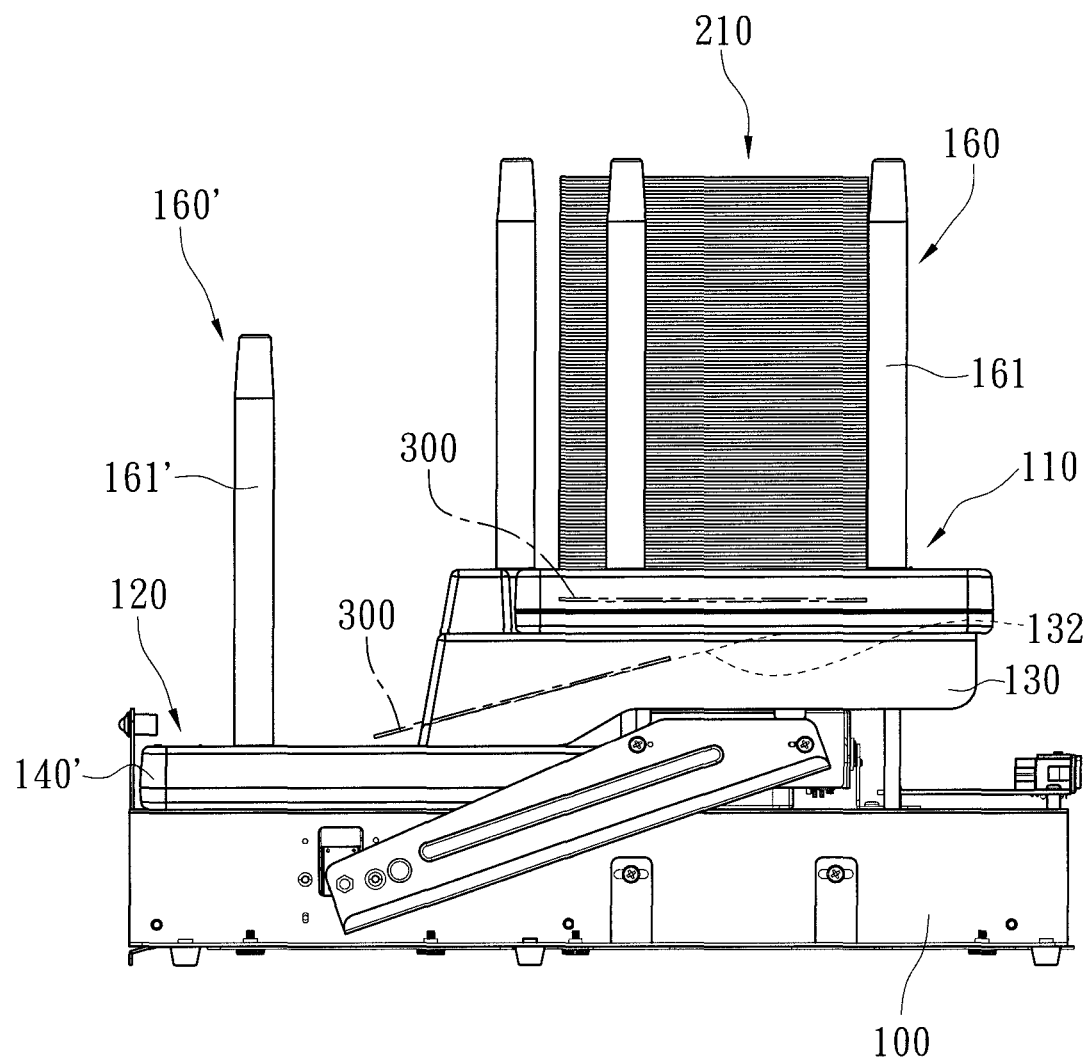
FIG. 4 is an operational and elevation view of the disk-feeding apparatus in FIG. 1.

Further refer to FIG. 3 and FIG. 4. When the stack of blank disks 220 held by the disk-guiding device 160' of the second disk-feeding device 120 is empty (as shown in FIG. 4), the bottom disk 300 of the stack of blank disks 210 held by the disk-guiding device 160 of the first disk-feeding device 110 is fed for the second disk-feeding device 120. The disk 300 is pulled down by gravity and passes through the disk inlet 131 onto the inclined conveying surface 132 through which the disk 300 slides down. The disk 300 passes through the disk outlet 133 and is received by the disk-guiding device 160' of the second disk-feeding device 120. Then, the disk 300 can be fed by the second disk-feeding device 120 onto the tray 101. Each disk of the stack of blank disks 210 is fed in the same manner to supply the second disk-feeding device 120.

Figure 5:
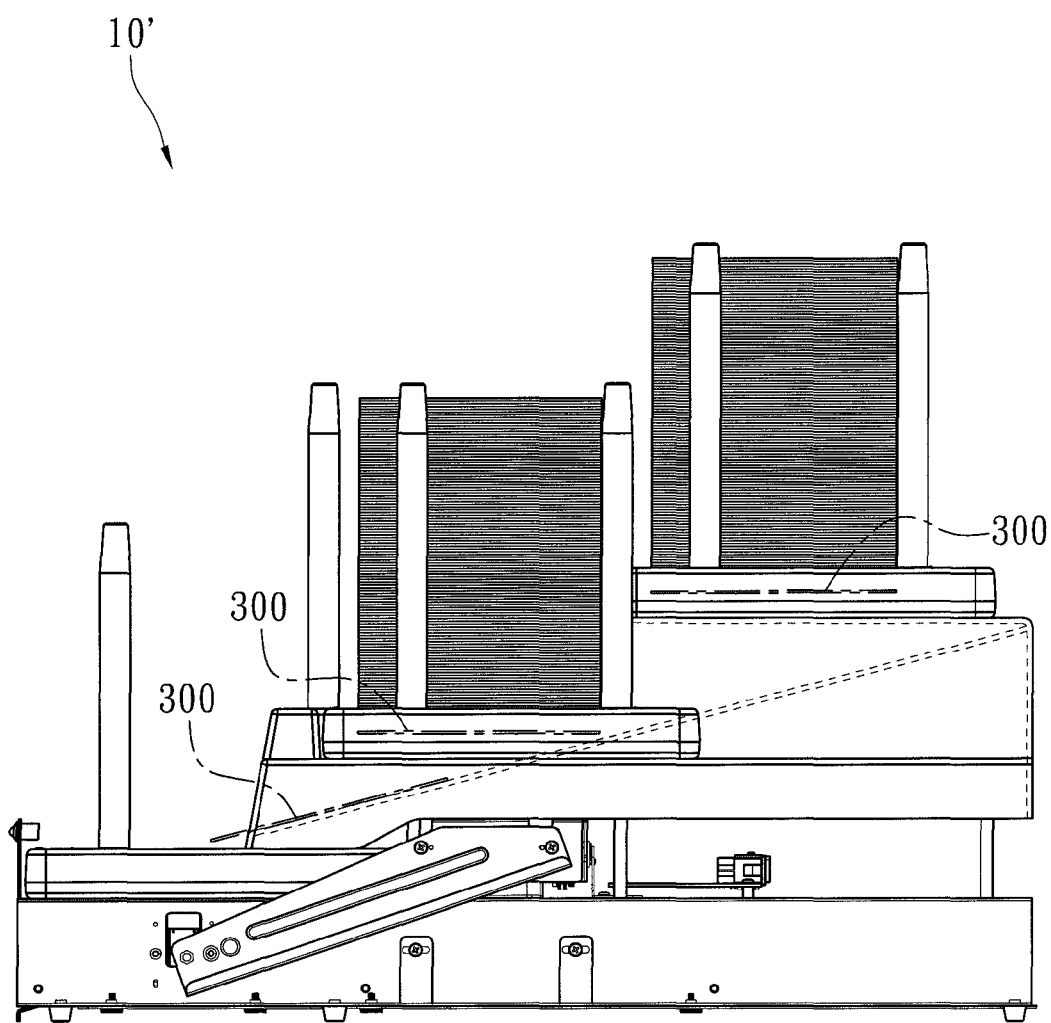
FIG. 5 is an elevation view of another embodiment of a disk-feeding apparatus with holding three stacks of disks.

Refer to FIG. 5. Another embodiment of a disk-feeding apparatus for information storage disks discloses that the disk-feeding apparatus 10' comprises three disk-feeding devices, and two intermediate conveyers mounted among the disk-feeding devices. Thus, the disk-feeding apparatus 10' holds three stacks of blank disks to feed or supply. Since operations and structure of the second embodiment are similar to the first embodiment, the disclosure of the second embodiment is omitted. A skilled person in this art will recognize the second embodiment by means of the disclosure of the first embodiment.

Consequently, the disk-feeding apparatus 10, 10' holds more than two stacks of blank disks so that it is not needed to regularly supply or refill the blank disks for the disk-feeding apparatus 10, 10'.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-stage disk-feeding apparatus for information storage disks, the disk-feeding apparatus comprising
a base;
at least two disk-feeding devices mounted on the base, each disk-feeding device disposed for holding a stack of blank disks along a vertical axis, wherein the vertical axes of the stacks of blank disks are parallel with one another; and
an intermediate conveyer mounted between each pair of adjacent disk-feeding devices, the intermediate conveyer comprising at least one inclined conveying surface for conveying a disk from one disk-feeding device to another disk-feeding device of each pair of adjacent disk-feeding devices.

2. A multi-stage disk-feeding apparatus as claimed in claim 1, wherein the intermediate conveyer comprises
a disk inlet positioned under the first disk-feeding device;
a disk outlet positioned over the second disk-feeding device, wherein the inclined conveying surface is defined between the disk inlet and the disk outlet to convey a disk passing through the disk inlet to the disk outlet.

3. A multi-stage disk-feeding apparatus as claimed in claim 1, wherein each of the at least two disk-feeding devices comprises
a body having a disk-feeding hole;
a disk-feeding mechanism mounted in the body to gradually and sequentially feed a disk; and
a disk-guiding device mounted on the body.

4. A multi-stage disk-feeding apparatus as claimed in claim 3, wherein the disk-guiding device comprises multiple posts.

5. A disk-feeding apparatus for information storage disks, the disk-feeding apparatus comprising
a base;
a first disk-feeding device and a second disk-feeding device mounted on the base, wherein the first disk-feeding device is located higher than the second disk-feeding device, and the first disk-feeding device and the second disk-feeding device are disposed for holding a stack of blank disks along a vertical axis respectively, wherein the two vertical axes of the stacks of blank disks are parallel with each other; and
an intermediate conveyer mounted between the first disk-feeding device and the second disk-feeding device, the intermediate conveyer comprising at least one inclined conveying surface for conveying a disk from the first disk-feeding device to the second disk-feeding device.

6. A disk-feeding apparatus as claimed in claim 5, wherein
the first disk-feeding device has a disk feeding hole;
the second disk-feeding device has a disk feeding hole; and
the intermediate conveyer comprises
a disk inlet positioned under the disk feeding hole of the first disk-feeding device;
a disk outlet positioned over the disk feeding hole of the second disk-feeding device, wherein the inclined conveying surface is defined between the disk inlet and the disk outlet to convey a disk passing through the disk inlet to the disk outlet.

7. A disk-feeding apparatus as claimed in claim 5, wherein each disk-feeding device comprises
a body;
a disk-feeding mechanism mounted in the body to gradually and sequentially feed a disk; and
a disk-guiding device mounted on the body.

8. A disk-feeding apparatus as claimed in claim 7, wherein the disk-guiding device comprises multiple posts.

9. A disk-feeding apparatus for information storage disks, the disk-feeding apparatus comprising
a base;
a first disk-feeding device and a second disk-feeding device mounted on the base, wherein the first disk-feeding device is located higher than the second disk-feeding device, the first disk-feeding device and the second disk-feeding device are substantially the same, and the first disk-feeding device and the second disk-feeding device are disposed for holding a stack of blank disks along a vertical axis respectively, wherein the two vertical axes of the stacks of blank disks are parallel with each other; and
an intermediate conveyer mounted between the first disk-feeding device and the second disk-feeding device, the intermediate conveyer comprising at least one inclined conveying surface for conveying a disk from the first disk-feeding device to the second disk-feeding device.

* * * * *